United States Patent
Bales (10) Patent No.: US 11,192,205 B2
(45) Date of Patent: Dec. 7, 2021

(54) SELF-LEVELING CONTAINER FOR LASER WELDING

(71) Applicant: United Technologies Corporation, Farmington, CT (US)

(72) Inventor: Daniel A. Bales, Avon, CT (US)

(73) Assignee: Raytheon Technologies Corporation, Farmington, CT (US)

(*) Notice: Subject to any disclaimer, the term of this patent is extended or adjusted under 35 U.S.C. 154(b) by 309 days.

(21) Appl. No.: 16/416,238

(22) Filed: May 19, 2019

(65) Prior Publication Data

US 2020/0361030 A1 Nov. 19, 2020

(51) Int. Cl.
*B23K 26/12* (2014.01)
*B23K 26/21* (2014.01)
*B23K 37/04* (2006.01)

(52) U.S. Cl.
CPC .......... *B23K 26/127* (2013.01); *B23K 26/123* (2013.01); *B23K 26/1224* (2015.10); *B23K 26/21* (2015.10); *B23K 37/04* (2013.01)

(58) Field of Classification Search
CPC .. B23K 26/127; B23K 26/1224; B23K 26/21; B23K 26/123; B23K 37/04
USPC .................................. 219/121.63, 121.67
See application file for complete search history.

(56) References Cited

U.S. PATENT DOCUMENTS

| | | | | |
|---|---|---|---|---|
| 3,046,793 A * | 7/1962 | Riordan | ............... | G01P 15/038 73/514.05 |
| 4,428,507 A * | 1/1984 | Sneider | ............... | A61J 1/05 222/105 |
| 5,072,857 A * | 12/1991 | Coleman | ............... | B67D 7/0277 222/94 |
| 6,044,929 A * | 4/2000 | Wishner | ............... | E06C 7/426 182/200 |
| 2006/0065651 A1 | 3/2006 | Wenwu | | |
| 2011/0203508 A1 | 8/2011 | Ottaviano | | |
| 2012/0033371 A1* | 2/2012 | Pankros | ............... | F16M 13/02 361/679.21 |
| 2014/0252930 A1* | 9/2014 | Reid | ............... | A47B 51/00 312/247 |
| 2017/0368639 A1 | 12/2017 | Kasler et al. | | |
| 2018/0185213 A1* | 7/2018 | Naber | ............... | A61G 5/061 |
| 2020/0135434 A1* | 4/2020 | Nakagawasai | ............... | H01L 21/68785 |

(Continued)

FOREIGN PATENT DOCUMENTS

DE 234823 A1 4/1986
EP 1481752 A2 12/2004

OTHER PUBLICATIONS

EP search report for EP20175087.4 dated Nov. 13, 2020.

*Primary Examiner* — Jimmy Chou
(74) *Attorney, Agent, or Firm* — Getz Balich LLC (57) ABSTRACT

A self-leveling container that contains argon gas for laser welding of a work piece includes a base surface, a plurality of pleated sidewalls, each comprising an associated distal sidewall end and an associated proximate sidewall end, where the proximate sidewall end is sealed to the base surface. A frame includes a plurality of frame segments, each secured to an associated one of the distal sidewall ends. A plurality of actuators, each located with one intersection of the plurality of frame segments, linearly move its associated one intersection of the plurality frame segments so a plane formed by the frame segments remains parallel to a planar surface.

18 Claims, 6 Drawing Sheets

(56) References Cited

U.S. PATENT DOCUMENTS

2020/0189432 A1\* 6/2020 Kelly ............... B60N 2/767
2020/0355590 A1\* 11/2020 Jia .................. H04B 11/00

\* cited by examiner

SELF-LEVELING CONTAINER FOR LASER WELDING

BACKGROUND OF THE INVENTION

1. Technical Field

The present disclosure relates to laser welding, more particularly to a self-leveling open container that surrounds a component being laser welded.

2. Background Information

Figure 1:
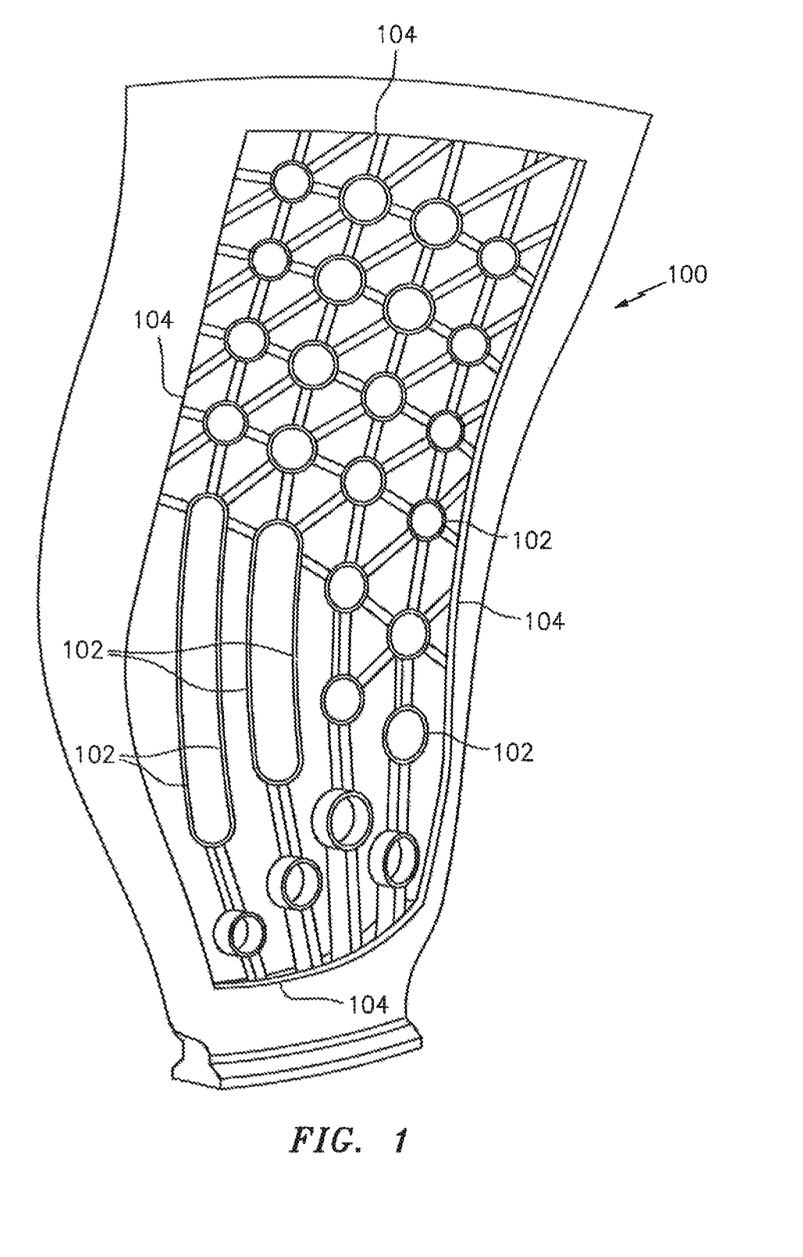
FIG. 1 illustrates a portion of a gas turbine engine fan blade in an intermediate state of manufacture, where a cover (not shown) has not yet been welded to the fan blade.

Hollow titanium fan blade construction uses a hot formed 3-D, twisted sheet metal cover (e.g., a first component) that is laser welded to a 3-D, twisted forging (e.g., a second component) that has been semi-finished machined externally with finished machined internal cavities connected by narrow ribs for reduced weight, but maintaining structural integrity. Once the sheet metal cover is fitted into the blade body's recess, it is first welded peripherally, then welded at strategic locations inboard of the peripheral weld. To ensure laser welding is near-perpendicular to the particular surface location of the first component to be welded to the second component, articulation occurs with both the blade's sub-fixture and the independent robot arm to which the laser is attached. Since the surface to be welded is a twisted shape (e.g., approximately 39" (99 cm) length by 20" (51 cm) in width), small variations in height occur as the laser tracks to weld the cover's periphery, and tracks to weld the cover to the internal circular ribs and racetracks. Externally positioned clamps secure the blade body to the base fixture and strategically clamp the cover to the blade body, such that tack welds can be made at pre-determined locations around the periphery that are between the external clamps (e.g., every two inches around the cover periphery). FIG. 1 illustrates a portion of a gas turbine engine fan blade 100 in an intermediate state of manufacture, where a cover (not shown) has not yet been welded to the fan blade 100. Referring to FIG. 1, a cover (not shown) is forced tightly against interior ribs 102 of the twisted forging of the blade 100, as well as between peripheral tack weld locations 104.

Laser tack welding of cavity-back hollow titanium fan blades is generally performed within an argon environment. Having the blade fully submerged within a container of high quality argon prevents oxygen and nitrogen contamination during the welding process. The fan blade is articulated via a motorized positioner, while the laser welding head is simultaneously articulated via a robot to ensure all welding occurs as near to vertical as possible. The ideal position for welding a sheet metal fan blade cover to a cavity-back blade body's machined ribs is when the cover is parallel to the floor and the rib is perpendicular to the cover. When such conditions exist, the combination of molten titanium's viscosity and surface tension results in the formation of uniform opposing fillets on the cover's underside at the juncture of the rib. If welding uphill on a steep incline, the molten titanium forms non-uniform fillets along the progression of the weld. If welding in a position where the juncture of the cover and rib is skewed/tilted from a vertical orientation, then an increased propensity for cover-to-rib fillet non-uniformity exists, resulting in increased stress concentration variability over the many feet of weld that must be created.

Argon gas protection during development is currently being achieved using an open container (about 4 feet×5 feet×5 feet/1.2×1.5×1.5 meters in size) constructed around the welding positioner with the bottom edges of the container's walls taped to the concrete floor to prevent the argon (which is heavier than air) from leaking. The container's interior is completely filled with argon (an approximate volume of 100 cubic feet) via an argon gas line from bottled argon. Such arrangement completely fills the open container, then spills over the top of the wall of the box and onto the surrounding floor of the welding booth.

What is needed is a self-leveling container that provides high purity argon gas coverage during welding, such that the container's top remains parallel to a planar weld booth floor.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a self-leveling container for laser welding a component. The container comprises a polygonal base surface, a plurality of pleated sidewalls each comprising an associated distal sidewall end and an associated proximate sidewall end, where the proximate sidewall end is sealed to the polygonal base surface, and a polygonal frame having a plurality of frame segments, each secured to an associated one of the distal sidewall ends. The container also includes a plurality of linear actuators each located with an associated frame intersection of the plurality of straight line frame segments, and a plurality of linear actuator frame brackets each located adjacent to an associated one of at least one of the associated frame intersections secured to the polygonal frame, where each of the plurality of linear actuator brackets is secured to a first axial end of an associated one of the plurality of linear actuators. A plurality of linear actuator base surface brackets are each located adjacent to an associated one of the base surface intersections of the polygonal base surface and secured to the base surface, where each of the plurality of linear actuator base surface brackets is secured to a second axial end of one of the plurality of linear actuators. A plurality of accelerometers are each located on an associated one of the plurality of frame segments, where each of the plurality of accelerometers provides an accelerometer signal indicative of position of the frame segment to which it is mounted.

The polygonal base surface and the polygonal frame may be rectangular.

The self-leveling container may comprise a two-dimensional positioner arm that is secured to the polygonal base surface.

The plurality of pleated sidewalls and the polygonal base surface may be gas impermeable.

The plurality of pleated sidewalls and the polygonal base surface may be impermeable to argon.

The polygonal base surface may include a gas inlet line that provides a gas to a container volume formed by the polygonal base surface and the plurality of pleated sidewalls.

At least one of the plurality of frame segments may include a gas recovery outlet open to the container volume to siphon off and recover gas within the container volume, and the gas recovery outlet may be connected to a vacuum source.

Aspects of the disclosure are also directed a self-leveling container that comprises a polygonal base surface, a plurality of pleated sidewalls each comprising an associated distal sidewall end and an associated proximate sidewall end, where the proximate sidewall end is sealed to the polygonal base surface, and a polygonal frame having a plurality of frame segments each secured to an associated one of the distal sidewall ends. The container also includes a plurality of actuators each located with an associated intersection of the plurality of frame segments to linearly move its associated one intersection of the plurality frame segments, and a plurality of actuator frame brackets each located adjacent to an associated one of the frame intersections of the plurality of frame segments and secured to the polygonal frame, where each of the plurality of actuator brackets is secured to a first axial end of one of the plurality of actuators. A plurality of actuator base surface brackets are each located adjacent to an associated one of the base surface intersections of the polygonal base surface and secured to the base surface, where each of the plurality of actuator base surface brackets is secured to a second axial end of one of the plurality of actuators. A plurality of accelerometers are each adjacent to an associated one of the base surface intersections of the polygonal base surface and secured to the base surface, where each of the plurality of accelerometers provides an accelerometer signal indicative of position of the associated base surface intersection.

The self-leveling container may include a plurality of second accelerometers, each located on one of the plurality of frame segments, where each of the plurality of second accelerometers provides an associated second accelerometer signal indicative of position of the frame segment to which it is mounted.

The self-leveling container may include a controller that receives the plurality of accelerometer signals and sends command signals to the plurality of actuators to maintain a plane formed by the polygonal frame parallel to a horizontal surface.

The self-leveling container may include a controller that receives the plurality of accelerometer signals and the second accelerometer signals and sends command signals to the plurality of actuators to maintain a plane formed by the polygonal frame parallel to a horizontal surface.

The polygonal base surface and the polygonal frame may be rectangular and the container may further comprise a two-dimensional positioner arm secured to the polygonal base surface.

The plurality of pleated sidewalls and the polygonal base surface may be impermeable to argon.

The polygonal base surface may include a gas inlet line that provides a gas to a container volume formed by the polygonal base surface and the plurality of pleated sidewalls.

At least one of the plurality of frame segments may include a gas recovery outlet open to the container volume to siphon off and recover gas within the container volume, and the gas recovery outlet is connected to a vacuum source.

Each of the plurality of actuator base surface brackets may include a base surface ball and cooperating base surface socket, where a proximate end of the actuator is secured to the base surface ball.

Each of the plurality of actuator frame brackets includes a frame ball and a cooperating frame ball socket, where a distal end of the actuator is secured to the frame ball.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 2:
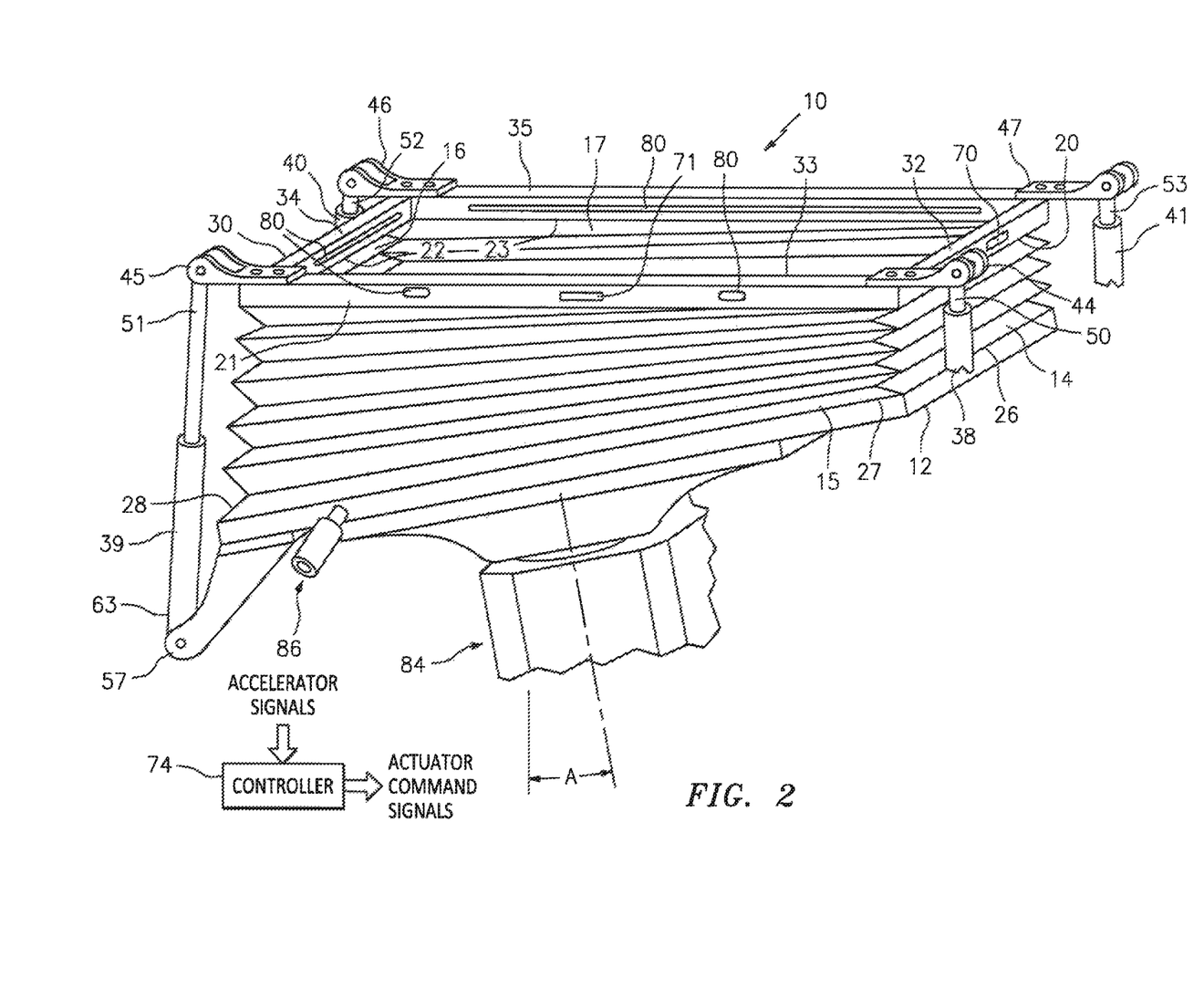
FIG. 2 is a pictorial illustration of a self-leveling container for laser welding.

FIG. 2 is a pictorial illustration of a self-leveling container 10 for laser welding of a component (not shown), which provides self-leveling in two (2) modes of operation: (1) rotation of the positioner's horizontal spindle which results in a positive or negative Angle A, and (2) rotation of the positioners vertical spindle when said vertical spindle is perpendicular to the floor. The self-leveling container comprises a polygonal base surface 12 and a plurality of pleated (e.g., concertinaed) sidewalls 14-17 each comprising a distal sidewall end 20-23 and a proximate sidewall end 26-29. Each of the proximate sidewall ends 26-29 is sealed to the base surface 12. This seal is preferably gas impermeable. The container 10 also includes a polygonal frame 30 (e.g., rigid) having a plurality of straight line frame segments 32-35, each secured to an associated one of the distal sidewall ends 20-23 of the plurality of pleated sidewalls 14-17.

A plurality of actuators 38-41 (e.g., linear actuators) is each located at one of an associated intersection of the plurality of straight line frame segments 32-35. To secure a first end of the actuators, a plurality of actuator frame brackets 44-47, each located adjacent to an associated one of the frame intersections, is secured to the polygonal frame 30. Each of the plurality of actuator brackets 44-47 is secured to a first axial end 50-53 of one of the plurality of actuators 38-41.

To secure a second end of the actuators, a plurality of actuator base surface brackets 56-59 (e.g., pinned clevises), each located adjacent to an associated one of the base surface intersections of the polygonal base surface 12, is secured to the base surface 12. Each of the plurality of actuator base surface brackets 56-59 is secured to a second axial end (e.g., 63) of the plurality of actuators 38-41.

For real-time automatic self-leveling of the open side of the container 10, a plurality of accelerometers 70-73 is provided. Each is located on an associated one of the plurality of straight line frame segments 32-35, and each provides an accelerometer signal indicative of position of the straight line frame segment to which it is mounted. The accelerometer signals are monitored by a controller 74, which issues command signals to each of the actuators to maintain the plane of the open surface of the container in a position parallel with the floor (e.g., horizontal). The controller 74 may be a microcontroller/processor with executable programs to perform the control function to maintain the plane of the open surface of the container in a position parallel with the floor (e.g., horizontal), based upon inputs from the accelerometers.

In the embodiment of FIG. 2, the polygonal base surface 12 and the polygonal frame 30 are both rectangular. In addition, a two-dimensional positioner arm 84 is secured to the polygonal base surface 12.

The plurality of pleated sidewalls 14-17 and the polygonal base surface 12 are substantially gas impermeable, e.g., substantially impermeable to argon in order to reduce gas loss.

Referring still to FIG. 2, the polygonal base surface 12 may include a gas inlet line 86 that provides a gas (e.g., argon) to the interior volume of the container formed by the polygonal base surface 12 and the plurality of pleated sidewalls 14-17. This allows the component being laser welded to be immersed in argon, which prevents oxygen and nitrogen contamination during the welding process.

The articulating intersections of the polygonal container ensure argon gas protection of the component being laser welded by monitoring the relative position of the open top of the container, and commanding the actuators to ensure the open top is maintained in a horizontal position (e.g., parallel to the floor).

Figure 3:
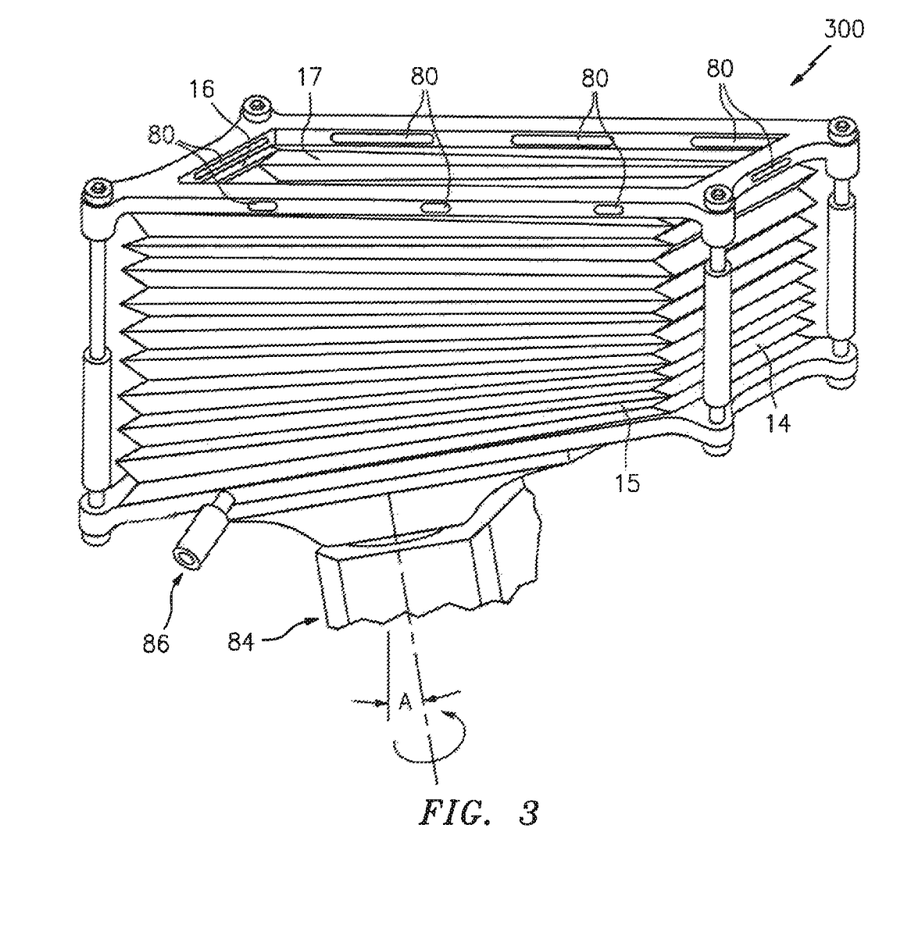
FIG. 3 is a pictorial illustration of a second embodiment of a self-leveling container for laser welding.

FIG. 3 is a pictorial illustration of a second embodiment 300 of a self-leveling container for laser welding which provides self-leveling in three (3) modes of operation: (1) rotation of the positioner's horizontal spindle which results in a positive or negative Angle A, (2) rotation of the positioner's nominally vertical spindle when the nominally vertical spindle is perpendicular to the floor, and (3) operation of modes 1 and 2 simultaneously, which is required for welding a titanium cover to a cavity-back hollow titanium fan blade body. In this embodiment the accelerometers are also located on the upper frame's straight line segments, in addition to or as alternative to the accelerometer on the frame segment.

Because welding of a cavity-back hollow titanium fan blade requires additional positioner articulation, the self-leveling container 10, 300 is preferably capable of providing additional degrees of movement beyond that described for FIG. 2, while not vectoring beyond vertical and into a position of instability. This may be achieved by preventing tilting of the accordion walls 14 beyond perpendicularity to the floor. This may be achieved by replacing each of the actuator base surface brackets (e.g., 56-59) illustrated in FIG. 2 with a ball and socket. It is contemplated that ball and socket joints may be used in corners of the base surface 12 to connect to a proximate end of the actuators, and/or in the corners of the top plate formed by the frame segments 32-35 to connect to a distal end of the actuators.

Figure 4:
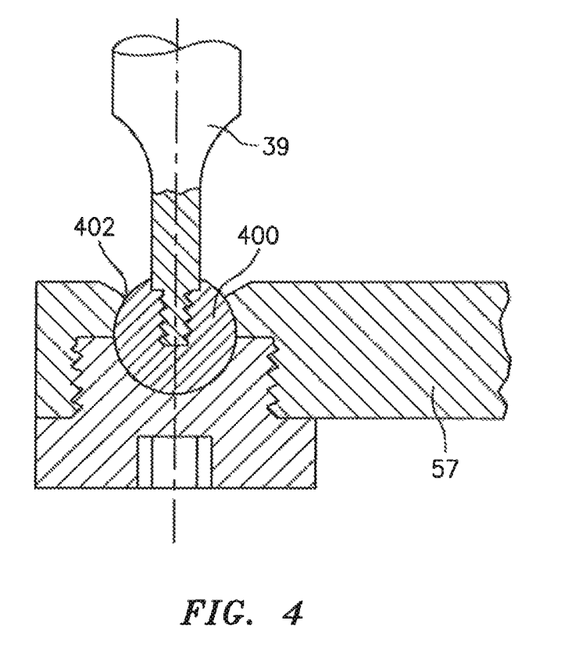
FIG. 4 is a sectional view of an actuator rod connected to the base surface of the self-leveling container illustrated in FIG. 3 via a spherical ball that rotates within a ball socket.

FIG. 4 is a sectional view of the actuator 39 connected to the base surface bracket 57 of the self-leveling container illustrated in FIG. 3 via a spherical ball 400, that rotates in a spherical ball socket 402. The base surface 12 has unrestricted (i.e., 360 degree rotation circumferentially about the actuator rod) movement to accommodate movement of the positioner 84. This ensures that a plane, formed by the top frame segments 32-35 of the container 10, 300, remains parallel to the floor during the welding of the cover to the blade and the required complex positioner articulation.

Figure 5:
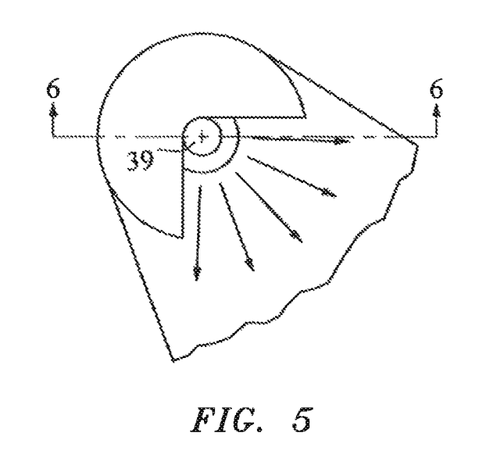
FIG. 5 is a partially cutaway illustration of an underside of an upper frame corner post of the container illustrated in FIG. 3.
Figure 6:
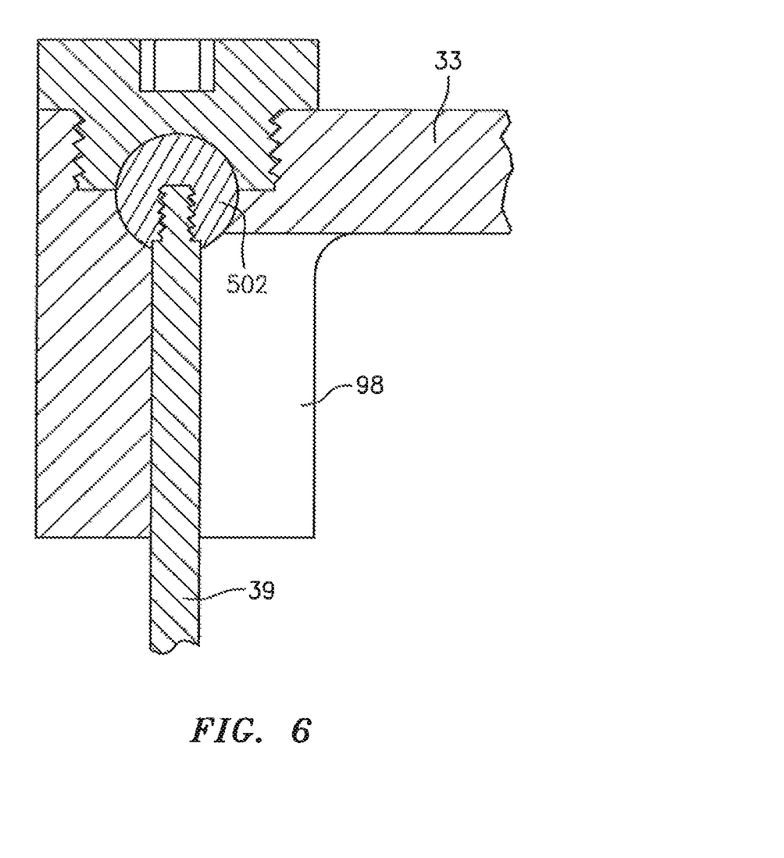
FIG. 6 is a sectional view taken along line 6-6 of FIG. 5.

FIG. 5 is a partial cutaway illustration of an underside of a corner post of the upper frame formed by the segments 32-35. Each of the corner posts of the upper frame formed by the segments 32-35 may include a ball and socket that attaches to an associated one of the actuators (38-41) at a distal end. In contrast to the ball and sockets used with the base surface and illustrated in FIG. 4, the ball and sockets used at the corner of the upper frame are range limited. This may be achieved with articulation restricting integral corner posts shown pictorially within FIG. 3 and shown in detail within FIGS. 5 and 6. Referring to FIGS. 5 and 6, the articulating top corner posts includes a spherical ball 502 that connect to a distal end of an associated actuator rod 39. The corner posts of FIGS. 5 and 6 may be machined from the underside to form recessed surface 98 that permits unrestricted movement within the inner quadrant of each corner, but provides restricted movement of actuator rods beyond 90 degrees at each corner. Such design, coupled with accelerometer feedback and actuator movements allows unrestricted articulation of the base surface 12 (FIG. 3), while ensuring the top frame formed by the segments 32-35 remains level and accordion walls 14 remain vertical, thus ensuring stability of the container 300 throughout all welding. It is contemplated that ball and socket joints at the distal and proximate ends of the actuators may all be the same design, as set forth in FIG. 4, or as set forth in FIGS. 5 and 6 the ball and socket joints at the corners of the top frame formed by the segments may be configured to limit the rotational range of motion as a mechanical limit.

Referring again to FIG. 3, to recover the argon gas that eventually reaches the top of the open container, at least one of the plurality of straight line frame segments 32-35 may include a gas recovery duct 80 open to the container volume, to siphon off and recover gas within the container volume. The least one of the plurality of straight line frame segments 32-35 is connected to a vacuum source. The recaptured argon gas may be input to a purification system and the resultant argon gas reused, therefore reducing cost.

It is contemplated that rather than a polygonal base surface, a circular base surface may be used.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:
1. A self-leveling container for laser welding a component, comprising:
  a polygonal base surface;
  a plurality of pleated sidewalls, each comprising an associated distal sidewall end and an associated proximate sidewall end, where the proximate sidewall end is sealed to the polygonal base surface;
  a polygonal frame having a plurality of frame segments, each secured to an associated one of the distal sidewall ends;
  a plurality of linear actuators, each located with an associated frame intersection of the plurality of frame segments;
  a plurality of linear actuator frame brackets, each located adjacent to at least one of the associated frame intersections secured to the polygonal frame, where each of the plurality of linear actuator brackets is secured to a first axial end of an associated one of the plurality of linear actuators;

a plurality of linear actuator base surface brackets, each located adjacent to an associated one of the base surface intersections of the polygonal base surface and secured to the base surface, where each of the plurality of linear actuator base surface brackets is secured to a second axial end of one of the plurality of linear actuators; and a plurality of accelerometers, each located on one of the plurality of frame segments, where each of the plurality of accelerometers provides an accelerometer signal indicative of position of the frame segment to which it is mounted.

2. The self-leveling container of claim 1, where the polygonal base surface and the polygonal frame are rectangular.

3. The self-leveling container of claim 1, further comprising a two-dimensional positioner arm that is secured to the polygonal base surface.

4. The self-leveling container of claim 1, where the plurality of pleated sidewalls and the polygonal base surface are gas impermeable.

5. The self-leveling container of claim 1, where the plurality of pleated sidewalls and the polygonal base surface are impermeable to argon.

6. The self-leveling container of claim 1, where the polygonal base surface includes a gas inlet line that provides a gas to a container volume formed by the polygonal base surface and the plurality of pleated sidewalls.

7. The self-leveling container of claim 6, where at least one of the plurality of frame segments includes a gas recovery outlet open to the container volume to siphon off and recover gas within the container volume, siphon off and recover gas within the container volume, and the gas recovery outlet is connected to a vacuum source.

8. The self-leveling container of claim 7, where the plurality of pleated sidewalls and the polygonal base surface are gas impermeable.

9. A self-leveling container, comprising:

a polygonal base surface;

a plurality of pleated sidewalls, each comprising an associated distal sidewall end and an associated proximate sidewall end, where the proximate sidewall end is sealed to the polygonal base surface;

a polygonal frame having a plurality of frame segments, each secured to an associated one of the distal sidewall ends;

a plurality of actuators, each located with one intersection of the plurality of frame segments, to linearly move its associated one intersection of the plurality frame segments;

a plurality of actuator frame brackets, each located adjacent to an associated one of the frame intersections of the plurality of frame segments and secured to the polygonal frame, where each of the plurality of actuator brackets is secured to a first axial end of one of the plurality of actuators;

a plurality of actuator base surface brackets, each located adjacent to an associated one of the base surface intersections of the polygonal base surface and secured to the base surface, where each of the plurality of actuator base surface brackets is secured to a second axial end of one of the plurality of actuators; and a plurality of accelerometers, each adjacent to an associated one of the base surface intersections of the polygonal base surface and secured to the base surface, where each of the plurality of accelerometers provides an accelerometer signal indicative of position of the associated base surface intersection.

10. The self-leveling container of claim 9, further comprising a plurality of second accelerometers, each located on one of the plurality of frame segments, where each of the plurality of second accelerometers provides an associated second accelerometer signal indicative of position of the frame segment to which it is mounted.

11. The self-leveling container of claim 9, further comprising a controller that receives the plurality of accelerometer signals and sends command signals to the plurality of actuators to maintain a plane formed by the polygonal frame parallel to a horizontal surface.

12. The self-leveling container of claim 10, further comprising a controller that receives the plurality of accelerometer signals and the second accelerometer signals and sends command signals to the plurality of actuators to maintain a plane formed by the polygonal frame parallel to a horizontal surface.

13. The self-leveling container of claim 10, where the polygonal base surface and the polygonal frame are rectangular and further comprising a two-dimensional positioner arm that is secured to the polygonal base surface.

14. The self-leveling container of claim 9, where the plurality of pleated sidewalls and the polygonal base surface are impermeable to argon.

15. The self-leveling container of claim 14, where the polygonal base surface includes a gas inlet line that provides a gas to a container volume formed by the polygonal base surface and the plurality of pleated sidewalls.

16. The self-leveling container of claim 15, where at least one of the plurality of frame segments includes a gas recovery outlet open to the container volume to siphon off and recover gas within the container volume, and the gas recovery outlet is connected to a vacuum source.

17. The self-leveling container of claim 9, where each of the plurality of actuator base surface brackets includes a base surface ball and a cooperating base surface socket, where a proximate end of the actuator is secured to the base surface ball.

18. The self-leveling container of claim 17, where each of the plurality of actuator frame brackets includes a frame ball and cooperating frame socket, where a distal end of the actuator is secured to the frame ball.

* * * * *